United States Patent [19]

Spaulding

[11] Patent Number: 4,528,730

[45] Date of Patent: Jul. 16, 1985

[54] HOSE CLAMP

[75] Inventor: George E. Spaulding, Woodridge, Ill.

[73] Assignee: Wittek Industries, Inc., Broadview, Ill.

[21] Appl. No.: 548,687

[22] Filed: Nov. 4, 1983

[51] Int. Cl.³ .................. B65D 63/00; F16L 33/08
[52] U.S. Cl. ..................... 24/274 R; 24/274 WB; 24/279; 24/20 LS
[58] Field of Search ............ 24/274 R, 274 WB, 278, 24/279, 20 CW, 20 EE, 20 LS, 22, 23 EE

[56] References Cited

U.S. PATENT DOCUMENTS

| 2,571,659 | 10/1951 | Bergstrom | 24/274 R |
| 4,099,304 | 7/1978 | Luc | 24/274 R |
| 4,237,588 | 12/1980 | Rasmussen et al. | 24/274 R |

FOREIGN PATENT DOCUMENTS

| 865085 | 1/1953 | Fed. Rep. of Germany | 24/274 R |
| 486395 | 11/1953 | Italy | 24/274 R |
| 80296 | 1/1956 | Netherlands | 24/274 R |
| 706207 | 3/1954 | United Kingdom | 24/274 R |
| 1486154 | 9/1977 | United Kingdom | 24/274 R |

Primary Examiner—Victor N. Sakran
Attorney, Agent, or Firm—Lyman R. Lyon

[57] ABSTRACT

The disclosure relates to a hose clamp comprising a band, a housing having a pair of juxtaposed legs having tabs engaged in load transfer relationship in an aperture in one end of said clamp band, and a screw journaled in said housing engageable with the other end of said band. A relieved area is provided between the legs of the clamp housing which permits the legs to rotate relative to one another about a point intermediate the width thereof to minimize spreading of the tabs and thereby to preclude rupture of the band at the aperture therein.

3 Claims, 6 Drawing Figures

U.S. Patent   Jul. 16, 1985   4,528,730
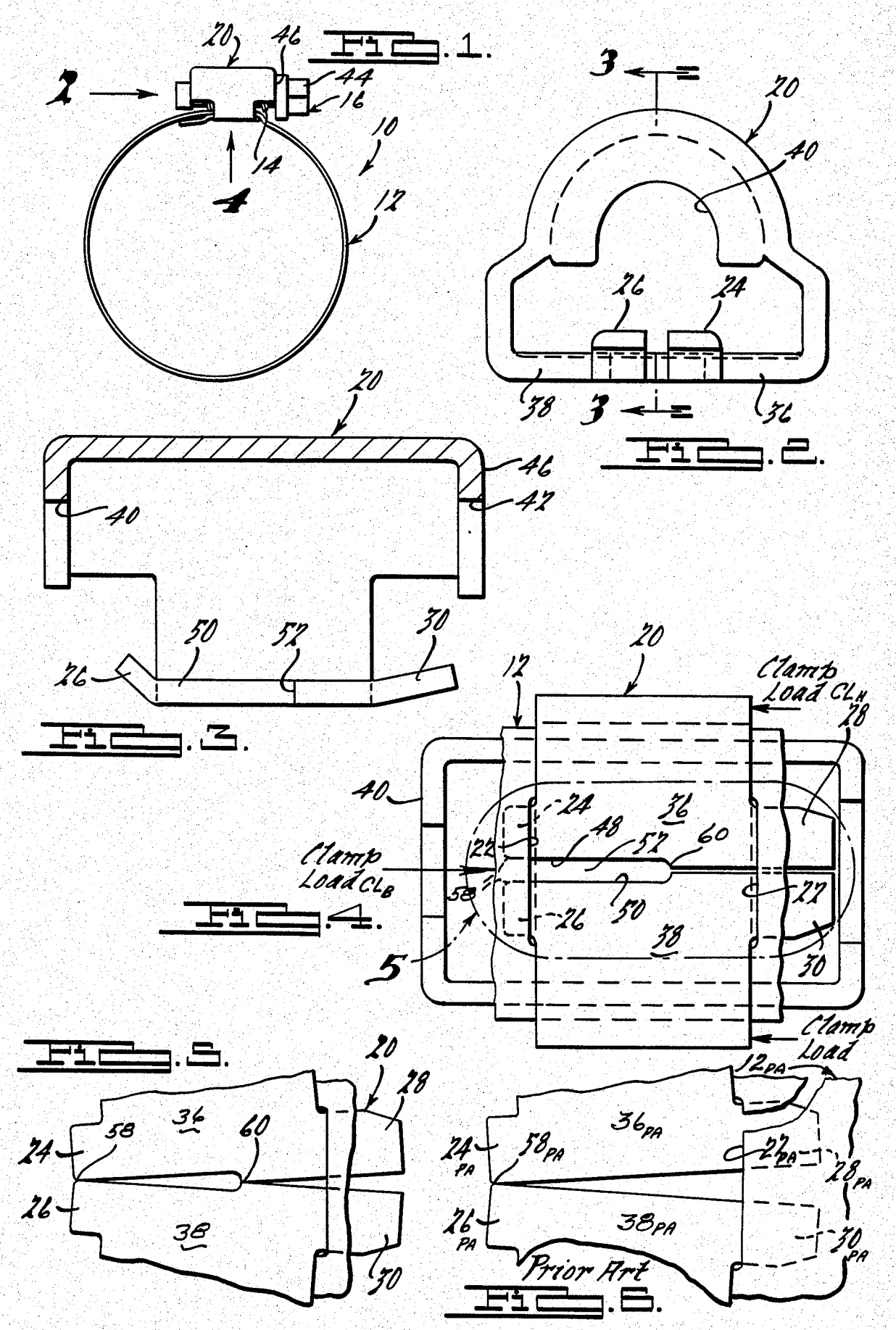

HOSE CLAMP

BACKGROUND OF THE INVENTION

Once a hose has been fully compressed by a hose clamp, further application of force to the screw of a worm drive hose clamp does nothing to improve the seal at the joint. Moreover, continued application of force, after full compression of the hose, will be destructive rather than productive.

In worm drive clamps, once the strap has stalled, continued rotation of the screw will move the screw along the strap into and through the housing. If the housing has been designed to resist this movement of the screw, the continuing rotation must be accommodated by housing flexure until one or more of the restraining member fails.

When the strap can no longer move due to full compression of the hose, it will attempt to accommodate the continuing effort by elimination of the angular thrust vector of the worm. It does this by aligning itself, or attempting to align itself to neutralize the thrust of the screw. This movement forces the screw thread to engage the strap at the serration edge. Continuing rotation accelerates the movement of the strap from under the screw.

One destructive force that is brought into play whenever loading is applied beyond that required to fully compress the hose is thrust of the strap which may force the legs of the housing to deflect and open, spreading the retaining tabs and fracturing the strap at the aperture therein. Stated in another manner, failure of clamps heretofore known and used is often due to rupture of the strap adjacent aperture therein that accepts the clamp housing due to spreading of the tabs of the housing. Such conventional clamp housings exhibit a pair of coacting lever arms which act to multiply the effect of excessive load applied to the strap by the screw. Therefore, it is apparent that to the extent such lever arms can be reduced and energy can be absorbed in the clamp housing, failure of the clamp strap can be ameliorated.

SUMMARY OF THE INVENTION

The problem of premature strap failure is solved, in accordance with the instant invention, by the use of a unique slot on the bottom of the clamp housing between portions of the juxtaposed legs thereof that both absorbs energy transmitted to the housing by the clamp screw and reduces the destructive lever arm thereby raising the failure threshhold of the clamp assembly.

BRIEF DESCRIPTION OF THE DRAWINGS

FIG. 1 is an elevational view of a clamp assembly with the band assembled into the housing and screw in operative relation with the band and housing;

FIG. 2 is a view taken in the direction of the arrow "2" of FIG. 1 with the band and screw removed from the housing;

FIG. 3 is a cross-sectional view taken substantially along the line 3—3 of FIG. 2;

FIG. 4 is a view taken in the direction of the arrow "4" with the band and screw removed from the housing;

FIG. 5 is a view taken within the circle 5 of FIG. 4 showing deformation of the clamp housing; and FIG. 6 is a view similar to FIG. 5 showing a prior art construction.

DETAILED DESCRIPTION OF THE PREFERRED EMBODIMENT OF THE INVENTION

A clamp 10 comprises a strap 12 of conventional ladder configuration for the acceptance of the threads 14 of a screw 16. The band 12 may be made from stainless steel or, when the environment permits, carbon steel or aluminum.

A housing 20 is secured in an aperture 22 (FIG. 4) in the band 12 as by staking therein oppositely disposed tabs 24, 26 and 28, 30 of leg portions 36 and 38 of the housing 20. The screw 16 is journaled in complementary arcuate recesses 40 and 42 at opposite ends of the housing 20, a head portion 44 of the screw 18 bearing against an end wall 46 of the housing 20 to accept clamp loads on the clamp 10

As best seen in FIG. 4, one load $CL_H$ on the housing 20 is derived from load on the ladder portion of the band 12 which is transferred to the screw 16, thence to the housing 20. A balancing load $CL_B$ on the housing 20 is derived from load on the portion of the band 12 having the aperture 22 therein which is transferred to the housing 20 by the edge of the aperture 22.

As best seen in FIG. 6, as a prior art clamp approaches failure, legs $36_{PA}$ and $38_{PA}$ move to the right and tend to rotate relative to one another, spreading to form a V-shaped notch. The tabs $24_{PA}$ and $26_{PA}$ on the legs $36_{PA}$ and $38_{PA}$ engage one another and function as a mutual fulcrum $58_{PA}$. Because of the relatively long lever arm between the fulcrum $58_{PA}$ and the points of engagement of the tabs $28_{PA}$ and $30_{PA}$ with the aperture $22_{PA}$, a small amount of deflection and spreading of the legs $36_{PA}$ and $38_{PA}$ to the right, as seen in FIG. 6, results in substantial separation of the tabs $28_{PA}$ and $30_{PA}$ rupturing the band $12_{PA}$ at the righthand side of the aperture $22_{PA}$ therein.

The aforesaid problem is solved, in accordance with the present invention, by relieving the end portions 48 and 50 of the legs 36 and 38 of the housing 20 adjacent the tabs 24 and 26 thereon, respectively, to define a slot 52 therebetween. The slot 52 extends from a point 58 at the ends of the tabs 24 and 26 (FIG. 6) to a point 60 at the midpoint of the juxtaposed leg portions 36 and 38 of the housing 20.

As best seen in FIG. 5, upon loading of the clamp 10 and deflection of the legs 36 and 38 to the right, the length of the lever arm between the fulcrum 60 and the points of contact of the tabs 28 and 30 with the periphery of the aperture 22 in the band 12 is reduced, reducing spreading of the tabs 28 and 30 and the tendency to rupture the band 12. In theory the optimum location for the fulcrum point 60 is on a line between the points of contact of the tabs 28 and 30 with the aperture 22. In practice, however, it has been found that extension of the slot 52 created by relief of the ends 48 and 50 of the legs 36 and 38, respectively, to a midpoint thereof is satisfactory for most applications.

While the preferred embodiment of the invention has been disclosed, it should be appreciated that the invention is susceptible of modification without departing from the scope of the following claim.

I claim:

1. In a hose clamp comprising a band, a housing having legs with juxtaposed oppositely directed tabs at the ends thereof, respectively, engaged in an aperture in one end of said clamp band in load transfer relationship therewith, and a screw journaled in said housing engageable with the other end of said band, the improvement comprising a relieved area between one pair of the opposed tabs on said legs defining a fulcrum intermediate said one pair of tabs and the other pair of tabs whereby said one pair of tabs can rotate toward one another about said fulcrum to minimize spreading of said other pair of tabs upon tensioning of said band.

2. A hose clamp in accordance with claim 1 wherein said relieved area comprises a slot having side walls, respectively, extending generally parallel to said band.

3. A hose clamp in accordance with claim 2 wherein said slot extends to approximately the circumferential midpoint of said housing.

* * * * *